United States Patent [11] 3,630,286

[72] Inventor Leonard John Persinski
    Pittsburgh, Pa.
[21] Appl. No. 76,217
[22] Filed Sept. 28, 1970
[45] Patented Dec. 28, 1971
[73] Assignee Calgon Corporation
    Pittsburgh, Pa.

[54] PROCESS FOR REMOVING WATER FROM A BOREHOLE USING POLYMERIC FOAMING AGENT
4 Claims, No Drawings

[52] U.S. Cl. .................................................. 166/309,
    175/71, 252/356
[51] Int. Cl. .................................................... E21b 21/00

[50] Field of Search ............................................. 166/309;
    175/69, 71; 252/8.5 C, 8.55 B, 356; 260/63 R

[56] References Cited
UNITED STATES PATENTS

| | | | |
|---|---|---|---|
| 2,168,116 | 8/1939 | Crites et al. ................... | 166/309 |
| 3,251,417 | 5/1966 | Holman et al. ............... | 166/309 X |
| 3,277,056 | 10/1966 | Coleman ....................... | 260/63 R |
| 3,305,019 | 2/1967 | Katzer .......................... | 252/8.55 B |

*Primary Examiner*—Ian A. Calvert
*Attorneys*—William L. Krayer and Herbert J. Zeh, Jr.

ABSTRACT: An improved process for removing water from boreholes and the like comprising using as a foaming agent a copolymer of acrylamide and diacetone acrylamide.

PROCESS FOR REMOVING WATER FROM A BOREHOLE USING POLYMERIC FOAMING AGENT

BACKGROUND OF THE INVENTION

This invention is directed to an improved process for removing water from oil wells, gas wells and other boreholes. More particularly, this invention is directed to the use of a copolymer of acrylamide and diacetone acrylamide as a foaming agent to facilitate the removal of water from boreholes with air or other gaseous fluids.

It has become the common practice in the art to use foaming agents to remove water from boreholes during air drilling operations. The foam increases the rate at which water can be carried to the surface by the air or other gaseous fluid. Heretofore, the most widely used foaming agents were soaps, detergents and the like. However, these compounds were not as effective as desired nor as economical as desired. More recently, high molecular weight water-soluble natural and synthetic polymers have been utilized in conjunction with soaps and the like as foaming agents. For example, see U.S. Pat. No. 3,251,417. However, while these polymers do create a foam for removing water, they are not as effective as desired. It has therefore become necessary in many operations to discontinue the use of air or gas and resort to siphoning or pumping out the water or to circulating a conventional drilling mud.

SUMMARY OF THE INVENTION

I have found that the efficiency of water removal in air drilling and similar operations can be improved by utilizing as a foaming agent a copolymer of acrylamide and diacetone acrylamide. The polymers of my invention increase foam production and provide a stable foam thereby increasing the rate at which water can be removed to the surface.

The polymers of my invention are random, linear, water-soluble copolymers of acrylamide and diacetone acrylamide. The polymer composition is from 5 to 60 percent by weight diacetone acrylamide and from 40 to 95 percent by weight acrylamide. The acrylamide portion of the polymer may be hydrolyzed such that up to 65 percent of the amide groups originally present are converted to carboxylic acid groups or carboxylate salt groups. The polymer has the structural formula illustrated below

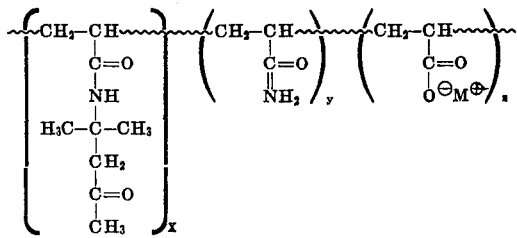

where $x$ is from 5 to 60 percent by weight, the sum of $y$ plus $z$ is from 40 to 95 percent by weight and $z$ is from 0 to 65 percent of the sum of $y$ plus $z$ and where M is selected from the group consisting of hydrogen, alkali metal and ammonium.

The actual composition of the polymeric foaming agent utilized in carrying out the invention will depend upon the particular composition of the water to be removed and the condition under which the water is removed. As is realized by one skilled in the art, a different polymeric foaming agent would be desired for removing brackish water than for plain well water. Therefore, the preferred polymer composition of my invention will ultimately depend on the characteristics of the individual application and will be a balance between the amount of diacetone acrylamide in the polymer and the amount of hydrolysis.

The polymers of my invention have all the essential characteristics necessary for an efficient water removal operation. The polymers are stable at the elevated temperatures found at the bottom of boreholes which may reach as high as 300° F. or higher. They are stable in brine and are nonprecipitating in the presence of the inorganic salts often found in the water that has to be removed. Finally, the polymers of my invention produce a very stable foam at relatively low concentrations.

The basic composition of the polymers of this invention have been disclosed by Coleman in U.S. Pat. No. 3,277,056. The use of these types of polymers as friction reducers is shown in U.S. Pat. No. 3,451,480, and the use of them in secondary oil recovering processes is shown in my copending application Ser. No. 842,349, filed July 16, 1969, entitled "Polymers for Waterflooding."

The polymers useful in my invention may be prepared by copolymerizing diacetone acrylamide and acrylamide in the desired ratio and then hydrolyzing the acrylamide moiety to obtain the desired amount of carboxylic functionality. The scope of this invention is independent of the polymerization technique and the hydrolysis technique used. One of ordinary skill in the art understands the various applicable techniques and would be able to prepare the appropriate compositions useful in my invention.

The polymers of my invention may have a wide range of molecular weights. The polymers will normally have a molecular weight ranging between 10,000 and 10,000,000 or higher. The molecular weight that is most effective will depend on the amount of diacetone acrylamide in the polymer and on the amount of hydrolysis of the acrylamide. In most cases, it is preferred that the polymer have a molecular weight in excess of 100,000.

My polymeric foaming agents will produce a utilizable foam when present in the water at concentrations of at least about 50 p.p.m. by weight, preferably 100 p.p.m. or more. The maximum concentration will largely be determined by economic considerations. However, for all practical purposes, a concentration greater than 1,500 p.p.m. will never be used. As is realized by one skilled in the art, the exact concentration employed will depend on the characteristics of the water being removed, the conditions under which it is being removed and the particular polymer being utilized.

A series of polymers were prepared containing various amounts of diacetone acrylamide and acrylamide. The polymers of each series were then hydrolyzed to various percentages. The resulting polymers were evaluated for properties that are desirable in effective foaming agents for water removal. The following tables illustrate the compositions of the polymers and the results of these evaluations.

TABLE 1

| Polymer Designation | DAA Content Weight Percent | Mole Percent | Acrylamide in Mole Percent | Hydrolyzed Acrylamide Units in Mole % |
|---|---|---|---|---|
| 0 DAA 0 | 0 | 0 | 100 | 0 |
| 0 DAA 10 | 0 | 0 | 90 | 10 |
| 0 DAA 20 | 0 | 0 | 80 | 20 |
| 0 DAA 40 | 0 | 0 | 60 | 40 |
| 5 DAA 0 | 5 | 2.13 | 97.87 | 0 |
| 5 DAA 10 | 5 | 2.13 | 87.87 | 10 |
| 5 DAA 20 | 5 | 2.13 | 77.87 | 20 |
| 5 DAA 30 | 5 | 2.13 | 67.87 | 30 |
| 5 DAA 40 | 5 | 2.13 | 57.87 | 40 |
| 30 DAA 10 | 30 | 16 | 74 | 10 |
| 30 DAA 20 | 30 | 16 | 64 | 20 |
| 30 DAA 30 | 30 | 16 | 54 | 30 |
| 30 DAA 40 | 30 | 16 | 44 | 40 |
| 50 DAA 0 | 50 | 29.6 | 70.4 | 0 |
| 50 DAA 10 | 50 | 29.6 | 60.4 | 10 |
| 50 DAA 20 | 50 | 29.6 | 50.4 | 20 |
| 50 DAA 30 | 50 | 29.6 | 40.4 | 30 |
| 50 DAA 40 | 50 | 29.6 | 30.4 | 40 |
| 60 DAA 0 | 60 | 38.6 | 61.4 | 0 |
| 60 DAA 10 | 60 | 38.6 | 51.4 | 10 |
| 60 DAA 20 | 60 | 38.6 | 41.4 | 20 |
| 60 DAA 30 | 60 | 38.6 | 31.4 | 30 |
| 60 DAA 40 | 60 | 38.6 | 21.4 | 40 |

Temperature Stability

Solutions of the polymers containing 1 gram of polymer per liter of distilled water were prepared. The viscosities of the solutions were measured using a Fann viscometer, model 35, at 73° F. and after being held for 24 hours at 172° F. The readings were taken at 100 r.p.m. The results are shown in table 2.

TABLE 2

| Polymer Composition | $\mu$ in cps. 73° F. | 172° F. |
| --- | --- | --- |
| 5 DAA 30 | 34.8 | 7.8 |
| 15 DAA 30 | 37.8 | 13.2 |
| 30 DAA 30 | 46.2 | 11.4 |
| 50 DAA 50 | 59.4 | 31.2 |

The results in table 2 show that the polymers of my invention are stable at the elevated temperatures encountered in many drilling operations.

Salt Stability

Solutions of the polymers containing 1 gram of active polymer per liter of distilled water were prepared. The viscosities of the solutions were measured using a Fann viscometer at 72° F. and 300 r.p.m. Increments of various salts were added and the viscosity measured after each increment. The salts used were $CaCl_2$, NaCl, and KCl. The results are shown in tables 3, 4, and 5.

TABLE 3

Effect of $Ca^{++}$

| Polymer | $Ca^{++}$ in p.p.m. | $\mu$ in cps. |
| --- | --- | --- |
| 0 DAA 20 | 100 | 5.8 |
| 5 DAA 30 | 100 | 8.2 |
| 30 DAA 30 | 100 | 7.8 |
| 0 DAA 20 | 500 | 3.4 |
| 5 DAA 30 | 500 | 2.6 |
| 30 DAA 30 | 500 | 2.6 |
| 0 DAA 20 | 900 | 2.9 |
| 5 DAA 30 | 900 | 1.8 |
| 30 DAA 30 | 900 | 2.0 |
| 0 DAA 20 | 1,300 | 2.7 |
| 5 DAA 30 | 1,300 | 1.4 |
| 30 DAA 30 | 1,300 | 1.8 |
| 0 DAA 20 | 2,300 | 2.5 |
| 5 DAA 30 | 2,300 | 1.4 |
| 30 DAA 30 | 2,300 | 1.6 |

TABLE 4

Effect of NaCl

| Polymer | NaCl in p.p.m. | $\mu$ in cps. |
| --- | --- | --- |
| 0 DAA 20 | 100 | 11.2 |
| 5 DAA 30 | 100 | 10.4 |
| 30 DAA 30 | 100 | 12.0 |
| 0 DAA 20 | 500 | 7.6 |
| 5 DAA 30 | 500 | 6.0 |
| 30 DAA 30 | 500 | 7.2 |
| 0 DAA 20 | 900 | 6.6 |
| 5 DAA 30 | 900 | 4.4 |
| 30 DAA 30 | 900 | 5.6 |
| 0 DAA 20 | 1,700 | 5.6 |
| 5 DAA 30 | 1,700 | 3.2 |
| 30 DAA 30 | 1,700 | 4.2 |
| 0 DAA 20 | 4,500 | 4.4 |
| 5 DAA 30 | 4,500 | 2.0 |
| 30 DAA 30 | 4,500 | 2.6 |

TABLE 5

Effect of KCl

| Polymer | KCl in p.p.m. | $\mu$ in cps. |
| --- | --- | --- |
| 0 DAA 20 | 100 | 11.6 |
| 15 DAA 30 | 100 | 13.0 |
| 50 DAA 30 | 100 | 25.0 |
| 0 DAA 20 | 500 | 8.4 |
| 15 DAA 30 | 500 | 8.6 |
| 50 DAA 30 | 500 | 17.4 |
| 0 DAA 20 | 900 | 7.3 |
| 15 DAA 30 | 900 | 6.8 |
| 50 DAA 30 | 900 | 14.2 |
| 0 DAA 20 | 1,700 | 6.2 |
| 15 DAA 30 | 1,700 | 5.0 |
| 50 DAA 30 | 1,700 | 10.8 |
| 0 DAA 20 | 4,500 | 4.8 |
| 15 DAA 30 | 4,500 | 3.2 |
| 50 DAA 30 | 4,500 | 6.8 |

The results in tables 3, 4, and 5 show that the polymers are stable in the presence of high electrolyte concentrations. Moreover, it should also be noticed that the polymers did not precipitate in the presence of these electrolytes. This is an important characteristic since the brines encountered in most drilling operations contain anywhere from a few parts per million to several percent of dissolved salts.

Surface Activity

Solutions of the polymers containing 250 p.p.m. of active polymer in distilled water were prepared. The surface tension was measured using a duNouy Tensiometer. Results are shown in table 6.

TABLE 6

| Polymer | Surface Tension in Dynes/Cm. |
| --- | --- |
| 0 DAA 0 | 68.0 |
| 5 DAA 0 | 68.3 |
| 15 DAA 0 | 65.5 |
| 30 DAA 0 | 59.5 |
| 50 DAA 0 | 54.4 |
| 60 DAA 0 | 51.7 |
| 60 DAA 10 | 53.2 |
| 60 DAA 20 | 53.2 |
| 60 DAA 30 | 55.4 |
| 60 DAA 40 | 54.3 |

The results in table 6 show the effect of increasing diacetone acrylamide on surface activity. The diacetone acrylamide imparts surface activity to the polymer and surface activity is an important property of an effective foaming agent.

Water Removing

The foaming tendency of the polymers of my invention was observed during the preparation of the polymer solutions for evaluation in tables 2 through 6 above. The foam produced during these tests was voluminous and tenacious. The water removing ability of the polymers was investigated in the following manner. A glass column, 1 inch in diameter and 42 inches in length was fitted with a gas bubbler connected to an air supply. Three hundred milliliters of tap water was added to the column. The water removing agent was then introduced and observations of its effectiveness made and recorded. Table 7 illustrates the results for one of the polymers of my invention.

TABLE 7

| Compound Tested | Concentration Used in p.p.m. | Percent $H_2O$ Removal |
|---|---|---|
| Nonylphenoxypoly (ethyleneoxy) ethanol | 50 | 60 |
| 50 DAA 50 | 300 | 97 |

I claim:

1. An improved process for removing water from a borehole to the surface comprising adding a foaming agent to the water and passing a gas through the water to generate foam and lift the foam to the surface wherein the improvement comprises using as the foaming agent a water-soluble, linear, high molecular weight polymer of 5 to 60 percent by weight diacetone acrylamide and 40 to 95 percent by weight acrylamide wherein up to 65 percent of the amide groups of the acrylamide are hydrolyzed to carboxylic groups.

2. Method of claim 1 wherein the polymer is used at a concentration of at least 50 p.p.m. by weight.

3. Method of claim 2 wherein the polymer has a molecular weight of at least 10,000.

4. Method of claim 1 wherein the polymer has a molecular weight of at least 10,000.

* * * * *

UNITED STATES PATENT OFFICE
CERTIFICATE OF CORRECTION

Patent No. 3,630,286   Dated December 28, 1971

Inventor(s) Leonard John Persinski

It is certified that error appears in the above-identified patent and that said Letters Patent are hereby corrected as shown below:

Column 1, line 45, in the formula section "y", the double bond between the carbon and nitrogen in the acrylamide should be a single bond.

Column 2, Table I, between 5 DAA 40 and 3 DAA 10, the following 15 DAA series and 30 DAA 0 should be inserted:

| | | | | |
|---|---|---|---|---|
| 15 DAA 0  | 15 | 6.93 | 93.17 | 0 |
| 15 DAA 10 | 15 | 6.93 | 83.17 | 10 |
| 15 DAA 20 | 15 | 6.93 | 73.17 | 20 |
| 15 DAA 30 | 15 | 6.93 | 63.17 | 30 |
| 15 DAA 40 | 15 | 6.93 | 53.17 | 40 |
| 30 DAA 0  | 30 | 16   | 84    | 0  |

Signed and sealed this 12th day of December 1972.

(SEAL)
Attest:

EDWARD M. FLETCHER, JR.
Attesting Officer

ROBERT GOTTSCHALK
Commissioner of Patents